United States Patent
Park et al.

(10) Patent No.: US 11,888,117 B2
(45) Date of Patent: Jan. 30, 2024

(54) NON-AQUEOUS ELECTROLYTE SOLUTION FOR LITHIUM SECONDARY BATTERY AND LITHIUM SECONDARY BATTERY COMPRISING SAME

(71) Applicant: LG Energy Solution, Ltd., Seoul (KR)

(72) Inventors: Solji Park, Daejeon (KR); Junghoon Lee, Daejeon (KR); Chul Haeng Lee, Daejeon (KR); Yoosun Kang, Daejeon (KR); Jaewon Lee, Daejeon (KR)

(73) Assignee: LG Energy Solution, Ltd.

( * ) Notice: Subject to any disclaimer, the term of this patent is extended or adjusted under 35 U.S.C. 154(b) by 0 days.

(21) Appl. No.: 18/021,006

(22) PCT Filed: Jul. 12, 2022

(86) PCT No.: PCT/KR2022/010153
§ 371 (c)(1),
(2) Date: Feb. 13, 2023

(87) PCT Pub. No.: WO2023/287178
PCT Pub. Date: Jan. 19, 2023

(65) Prior Publication Data
US 2023/0299347 A1     Sep. 21, 2023

(30) Foreign Application Priority Data
Jul. 14, 2021   (KR) .................. 10-2021-0092060

(51) Int. Cl.
*H01M 10/0567* (2010.01)
*H01M 50/46* (2021.01)
*H01M 10/052* (2010.01)
*H01M 10/0568* (2010.01)
*H01M 10/0569* (2010.01)

(52) U.S. Cl.
CPC ..... *H01M 10/0567* (2013.01); *H01M 10/052* (2013.01); *H01M 10/0568* (2013.01); *H01M 10/0569* (2013.01); *H01M 50/46* (2021.01); *H01M 2300/0028* (2013.01)

(58) Field of Classification Search
CPC ........... H01M 10/052; H01M 10/0525; H01M 10/0568; H01M 10/0569; H01M 2300/0028
See application file for complete search history.

(56) References Cited

U.S. PATENT DOCUMENTS

2010/0035147 A1    2/2010   Kotato et al.
2010/0273065 A1*  10/2010   Lee .................. H01M 10/0567
                                                         429/325
2014/0234704 A1*   8/2014   Kamizori ........... H01M 10/052
                                                         429/200
2015/0010811 A1    1/2015   Egorov et al.
2015/0333370 A1*  11/2015   Abe ..................... H01M 4/587
                                                         429/200
2016/0027592 A1*   1/2016   Shimamoto ........... H01G 11/60
                                                         429/188
2016/0315351 A1   10/2016   Kotou et al.
2017/0275311 A1    9/2017   Kotou et al.
2017/0288269 A1   10/2017   Moganty et al.
2018/0198157 A1    7/2018   Yu et al.
2018/0301758 A1*  10/2018   Abe ..................... H01M 4/525
2020/0044287 A1    2/2020   Kim et al.
2020/0388887 A1   12/2020   Takehara et al.
2021/0083327 A1*   3/2021   Liu .................. H01M 10/4235
2021/0151799 A1*   5/2021   Shin .................. H01M 10/0525
2021/0313621 A1*  10/2021   Park .................. H01M 10/0568
2022/0255120 A1*   8/2022   Deng ................. H01M 10/0567

FOREIGN PATENT DOCUMENTS

| | | |
|---|---|---|
| JP | WO2013168716 A1 | 1/2016 |
| JP | 2017022108 A | 1/2017 |
| JP | 6414077 B2 | 10/2018 |
| KR | 20140082939 A | 7/2014 |
| KR | 20150006364 A | 1/2015 |
| KR | 20160006097 A | 1/2016 |
| KR | 20160100964 A | 8/2016 |
| KR | 20180131580 A | 12/2018 |
| KR | 20190008100 A | 1/2019 |
| KR | 102000100 B1 | 7/2019 |
| KR | 20200118821 A | 10/2020 |
| KR | 102275862 B1 | 7/2021 |
| WO | 2008123038 A1 | 10/2008 |
| WO | 2015093091 A1 | 6/2015 |

OTHER PUBLICATIONS

International Search Report for PCT/KR2022/010153 dated Oct. 24, 2022. 3 pgs.

* cited by examiner

*Primary Examiner* — Jeremiah R Smith
(74) *Attorney, Agent, or Firm* — Lerner David LLP

(57) ABSTRACT

One embodiment of the present invention provides a non-aqueous electrolyte solution for a lithium secondary battery, including a lithium salt, an organic solvent and a compound represented by Formula 1 as a first additive,

[Formula 1]

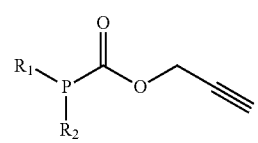

wherein, $R_1$ and $R_2$ are described herein.

12 Claims, No Drawings

NON-AQUEOUS ELECTROLYTE SOLUTION FOR LITHIUM SECONDARY BATTERY AND LITHIUM SECONDARY BATTERY COMPRISING SAME

CROSS-REFERENCE TO RELATED APPLICATIONS

The present application is a national stage entry under 35 U.S.C. § 371 of International Application No. PCT/KR2022/010153 filed on Jul. 12, 2022, which claims priority from Korean Patent Application No. 10-2021-0092060 filed on Jul. 14, 2021, all the disclosures of which are incorporated herein by reference.

TECHNICAL FIELD

The present invention relates to a non-aqueous electrolyte solution and a lithium secondary battery including the same, and in particular, to a non-aqueous electrolyte solution capable of enhancing quick charging performance and resistance properties of a secondary battery, and a lithium secondary battery including the same.

BACKGROUND ART

A lithium secondary battery is generally manufactured by forming an electrode assembly through providing a separator between a positive electrode including a positive electrode active material formed with a lithium-containing transition metal oxide and a negative electrode including a negative electrode active material capable of storing lithium ions, inserting the electrode assembly to a battery case, injecting a non-aqueous electrolyte solution that is a medium transferring lithium ions thereto, and then sealing the result.

Such a lithium secondary battery is used in electric vehicles and the like as well as in portable electronic devices such as mobile phones or notebook computers, and demands thereon is rapidly increasing. As demands for a lithium secondary battery increases and subject of application becomes diverse, a level of performance required for a lithium secondary battery is gradually increasing as well. For example, high energy density, high output properties, and durability usable for a long period of time under a harsh condition are required for a lithium secondary battery used for electrical vehicles. In addition thereto, demands for quick charging performance capable of charging a battery in a short period of time is also increasing recently.

However, lithium secondary batteries that have been developed so far do not have sufficient quick charging performance, and, even when quick charge is possible, have a problem of rapidly declining battery performance when quick charge is repeated.

PRIOR ART DOCUMENTS

Patent Documents (Patent Document 1) Korean Laid-open Patent Publication No. 2019-0008100
(Patent Document 2) International Publication No. 2015-093091

DISCLOSURE

Technical Problem

One embodiment of the present invention has been made to resolve such problems, and is directed to providing a non-aqueous electrolyte solution capable of enhancing quick charging performance and output properties of a lithium secondary battery, and a lithium secondary battery including the same.

Technical Solution

In order to achieve the above objects, one embodiment of the present invention provides a non-aqueous electrolyte solution for a lithium secondary battery, including a lithium salt, an organic solvent and a compound represented by the following Formula 1 as a first additive.

[Formula 1]

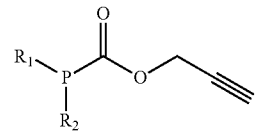

In Formula 1 above,
$R_1$ and $R_2$ are the same as or different from each other, and are each independently a substituted or unsubstituted C1 to C10 alkyl group; a substituted or unsubstituted C2 to C10 alkenyl group; a substituted or unsubstituted C2 to C10 alkynyl group; a substituted or unsubstituted C6 to C20 aryl group; or a substituted or unsubstituted C1 to C10 trialkylsiloxy group.

In addition, one embodiment of the present invention provides the non-aqueous electrolyte solution for a lithium secondary battery, in which $R_1$ and $R_2$ in Formula 1 above are the same as or different from each other, and are each independently a substituted or unsubstituted C1 to C10 alkyl group; or a substituted or unsubstituted C1 to C10 trialkylsiloxy group.

In addition, one embodiment of the present invention provides the non-aqueous electrolyte solution for a lithium secondary battery, in which $R_1$ and $R_2$ in Formula 1 above are substituted with a substituted or unsubstituted C3 to C10 trialkylsiloxy group.

In addition, one embodiment of the present invention provides the non-aqueous electrolyte solution for a lithium secondary battery, in which the compound represented by Formula 1 is a compound represented by any one of the following Formula 1-1 to Formula 1-7.

[Formula 1-1]

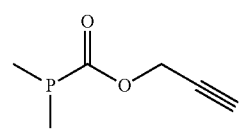

[Formula 1-2]

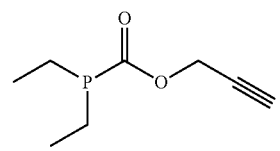

[Formula 1-3]

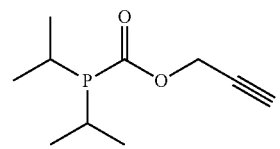

-continued

[Formula 1-4]
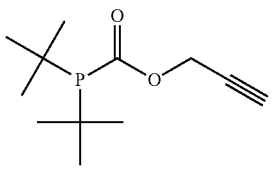

[Formula 1-5]
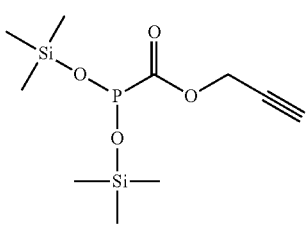

[Formula 1-6]
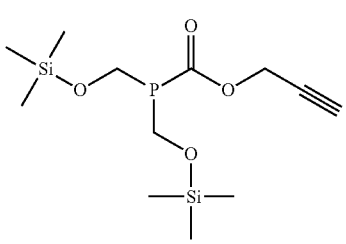

[Formula 1-7]
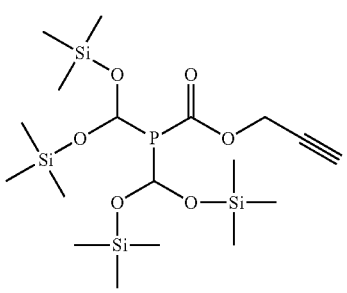

In addition, one embodiment of the present invention provides the non-aqueous electrolyte solution for a lithium secondary battery, in which the first additive is included in an amount of 0.01% by weight to 10% by weight with respect to a total weight of the electrolyte solution.

In addition, one embodiment of the present invention provides the non-aqueous electrolyte solution for a lithium secondary battery, further including a second additive, wherein the second additive is at least one selected from the group consisting of vinyl ethylene carbonate (VEC), vinylene carbonate (VC), fluoroethylene carbonate (FEC), propane sultone (PS), ethylene sulfate (ESa), succinonitrile (SN), 1,3,6-hexane tricarbonitrile (HTCN), 1,4-dicyano-2-butene (DCB), ethylene glycol bis(propionitrile) ether, propargyl 1H-imidazole-1-carboxylate, methyl prop-2-ynyl carbonate, fluorobenzene (FB), difluorobenzene, hexafluorobenzene, 1,1,2,2-tetrafluoroethyl-2,2,2-trifluoroethyl ether, bis(trifluoromethyl)-1,3-dioxolane and 1,1,2,2-tetrafluoroethyl-2,2,3,3-tetrafluoropropyl ether.

In addition, one embodiment of the present invention provides the non-aqueous electrolyte solution for a lithium secondary battery, in which the second additive is included in an amount of 0.01% by weight to 10% by weight with respect to a total weight of the electrolyte solution.

In addition, one embodiment of the present invention provides the non-aqueous electrolyte solution for a lithium secondary battery, in which the lithium salt is selected from the group consisting of LiCl, LiBr, LiI, $LiBF_4$, $LiClO_4$, $LiB_{10}Cl_{10}$, $LiAlCl_4$, $LiAlO_4$, $LiPF_6$, $LiCF_3SO_3$, $LiCH_3CO_2$, $LiCF_3CO_2$, $LiAsF_6$, $LiSbF_6$, $LiCH_3SO_3$, LiFSI (lithium bis (fluorosulfonyl)imide, $LiN(SO_2F)_2$), LiTFSI (lithium bis (trifluoromethanesulfonyl)imide, $LiN(SO_2CF_3)_2$), LiBETI (lithium bisperfluoroethanesulfonimide, $LiN(SO_2CF_2CF_3)_2$), LiBOB (lithium bis(oxalate) borate, $LiB(C_2O_4)_2$), LiODFB (lithium difluoro(ethanedioato)borate, $LiBF_2(C_2O_4)$), LiDFP (lithium difluorophosphate, $F_2LiO_2P$), LiDFOP (lithium difluoro bis(oxlato) phosphate) and LiTDI (lithium 4,5-dicyano-2-(trifluoromethyl)imidazolide).

In addition, one embodiment of the present invention provides the non-aqueous electrolyte solution for a lithium secondary battery, in which the lithium salt has a concentration of 0.1 M to 3 M.

In addition, one embodiment of the present invention provides the non-aqueous electrolyte solution for a lithium secondary battery, in which the organic solvent includes at least one selected from the group consisting of ethers, esters, amides, linear carbonates and cyclic carbonates.

In addition, one embodiment of the present invention provides a lithium secondary battery including a positive electrode, a negative electrode, a separator interposed between the positive electrode and the negative electrode, and the non-aqueous electrolyte solution for a lithium secondary battery described above.

Advantageous Effects

The non-aqueous electrolyte solution for a lithium secondary battery according to one embodiment of the present invention includes a compound represented by Formula 1 as a first additive, thereby implementing a lithium secondary battery having superior quick charging performance, output improving effect and gas reducing effect.

BEST MODE

Specific embodiments provided according to the present specification may all be achieved by the following descriptions. The following descriptions need to be understood as describing preferred specific embodiments of the present invention, and it needs to be understood that the present invention is not limited thereto.

In addition, in the present specification, a term "substituted or unsubstituted" means being substituted with one or more substituents selected among deuterium, a halogen group, a hydroxyl group, an amino group, a thiol group, a nitro group, a nitrile group, a silyl group, a siloxy group and a linear or branched C1-C6 alkoxy group, or having no substituents.

One embodiment of the present invention provides a non-aqueous electrolyte solution for a lithium secondary battery, including a lithium salt, an organic solvent and a compound represented by the following Formula 1.

[Formula 1]
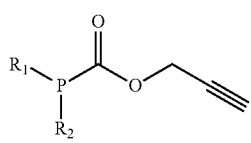

In Formula 1,
$R_1$ and $R_2$ above are the same as or different from each other, and are each independently a substituted or unsubstituted C1 to C10 alkyl group; a substituted or unsubstituted C2 to C10 alkenyl group; a substituted or unsubstituted C2 to C10 alkynyl group; a substituted or unsubstituted C6 to C20 aryl group; or a substituted or unsubstituted C1 to C10 trialkylsiloxy group.

In one embodiment of the present invention, $R_1$ and $R_2$ in the compound represented by Formula 1 above are the same as or different from each other, and may be each independently a substituted or unsubstituted C1 to C10 alkyl group, preferably a substituted or unsubstituted C1 to C5 alkyl group and more preferably a substituted or unsubstituted C1 to C4 alkyl group.

In one embodiment of the present invention, $R_1$ and $R_2$ in the compound represented by Formula 1 may be substituted with a substituted or unsubstituted C3 to C10 trialkylsiloxy group, preferably substituted with a substituted or unsubstituted C3 to C5 trialkylsiloxy group and more preferably substituted with a trimethylsiloxy group.

In one embodiment of the present invention, $R_1$ and $R_2$ in the compound represented by Formula 1 are the same as or different from each other, and may be each independently a substituted or unsubstituted C3 to C10 trialkylsiloxy group, preferably a C3 to C5 trialkylsiloxy group and more preferably a trimethylsiloxy group.

In one embodiment of the present invention, the compound represented by Formula 1 may be a compound represented by any one of the following Formula 1-1 to Formula 1-7.

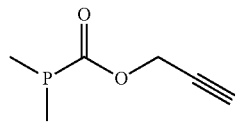

[Formula 1-1]

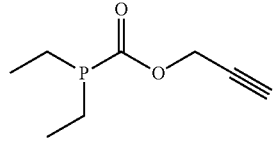

[Formula 1-2]

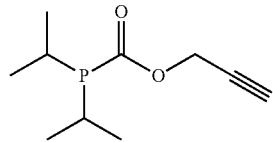

[Formula 1-3]

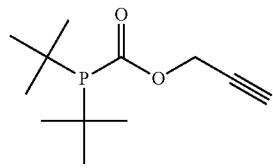

[Formula 1-4]

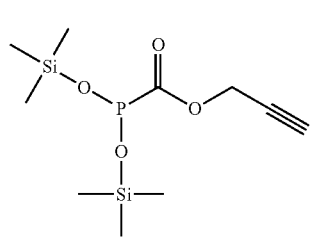

[Formula 1-5]

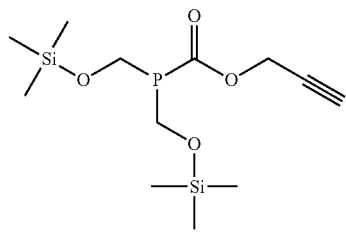

[Formula 1-6]

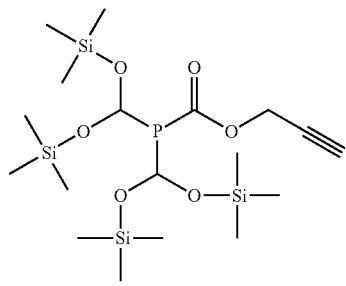

[Formula 1-7]

In one embodiment of the present invention, the compound represented by Formula 1 may be preferably a compound represented by the following Formula 1-1 or Formula 1-7.

In one embodiment of the present invention, the non-aqueous electrolyte solution for a lithium secondary battery includes the compound represented by Formula 1 as a first additive, thereby enabling quick charging and suppressing degradation of battery performance even when quick charging is repeated.

In one embodiment of the present invention, the first additive may be included in an amount of 0.01% by weight to 10% by weight, preferably in 0.01% by weight to 5% by weight and more preferably in 0.1% by weight to 3% by weight with respect to the total weight of the electrolyte liquid. If the content of the first additive is less than the above range, effects of improving quick charging performance and improving a positive electrode film are insignificant, and if the content of the first additive exceeds the above range, there is a problem in that resistance increases and oxidation stability is reduced due to decomposition of the first additive. Accordingly, the content of the first additive preferably satisfies the above range.

In addition, in one embodiment of the present invention, the non-aqueous electrolyte solution for a lithium secondary battery may further include a second additive, and the second additive may be at least one selected from the group consisting of vinyl ethylene carbonate (VEC), vinylene carbonate (VC), fluoroethylene carbonate (FEC), propane sultone (PS), ethylene sulfate (ESa), succinonitrile (SN), 1,3,6-hexane tricarbonitrile (HTCN), 1,4-dicyano-2-butene (DCB), ethylene glycol bis(propionitrile) ether, propargyl 1H-imidazole-1-carboxylate, methyl prop-2-ynyl carbonate, fluorobenzene (FB), difluorobenzene, hexafluorobenzene, 1,1,2,2-tetrafluoroethyl-2,2,2-trifluoroethyl ether, bis(trifluoromethyl)-1,3-dioxolane and 1,1,2,2-tetrafluoroethyl-2,2,3,3-tetrafluoropropyl ether.

In addition, in one embodiment of the present invention, the second additive may be included in an amount of 0.01% by weight to 10% by weight, preferably in 0.01% by weight to 5% by weight and more preferably in 0.1% by weight to 3% by weight with respect to the total weight of the electrolyte liquid. If the content of the second additive is less than the above range, an effect of improving quick charging performance is insignificant due to decreased film stability of an electrode, and if the content of the second additive exceeds the above range, there are problems in that electrode film resistance increases due to decomposition of the second additive and side reactions occur. Accordingly, the content of the second additive preferably satisfies the above range.

In one embodiment of the present invention, the non-aqueous electrolyte solution for a lithium secondary battery may include a lithium salt, and the lithium salt may be at least one selected from the group consisting of LiCl, LiBr, LiI, LiBF$_4$, LiClO$_4$, LiB$_{10}$Cl$_{10}$, LiAlCl$_4$, LiAlO$_4$, LiPF$_6$, LiCF$_3$SO$_3$, LiCH$_3$CO$_2$, LiCF$_3$CO$_2$, LiAsF$_6$, LiSbF$_6$, LiCH$_3$SO$_3$, LiFSI (lithium bis(fluorosulfonyl)imide, LiN(SO$_2$F)$_2$), LiTFSI (lithium bis(trifluoromethanesulfonyl)imide, LiN(SO$_2$CF$_3$)$_2$). LiBETI (lithium bisperfluoroethanesulfonimide, LiN(SO$_2$CF$_2$CF$_3$)$_2$), LiBOB (lithium bis (oxalate) borate, LiB(C$_2$O$_4$)$_2$). LiODFB (lithium difluoro (ethanedioato)borate, LiBF$_2$(C$_2$O$_4$)), LiDFP (lithium difluorophosphate, F$_2$LiO$_2$P), LiDFOP (lithium difluoro bis (oxlato) phosphate) and LiTDI (lithium 4,5-dicyano-2-(trifluoromethyl)imidazolide).

The lithium salt may have a concentration of 0.1 M to 3.0 M, preferably 0.5 M to 2.5 M and more preferably 0.8 M to 2.0 M. If the lithium salt concentration is less than 0.1 M, conductivity of the electrolyte solution decreases, and thus electrolyte solution performance declines, and if the concentration exceeds 3.0 M, viscosity of the electrolyte solution increases, which causes a problem of reducing lithium ion mobility. Accordingly, the lithium salt concentration preferably satisfies the above range. The lithium salt acts as a lithium ion supply source in a battery, and enables basic lithium secondary battery operation.

In one embodiment of the present invention, the non-aqueous electrolyte solution for a lithium secondary battery may include an organic solvent, and as the organic solvent, solvents commonly used in a lithium secondary battery, for example, ether compounds, ester (acetates, propionates) compounds, amide compounds, linear carbonate or cyclic carbonate compounds, and the like may be either alone or a mixture of two or more types thereof.

Among the compounds listed above, it is preferable that linear carbonates and cyclic carbonates may be mixed and used as the organic solvent. If mixing and using linear carbonates and cyclic carbonates as the organic solvent, dissociation and migration of the lithium salt may be facilitated. In this case, the cyclic carbonate-based compound and the linear carbonate-based compound may be mixed in a volume ratio of 1:9 to 6:4, preferably 1:9 to 4:6 and more preferably 2:8 to 4:6.

Meanwhile, specific examples of the linear carbonate compound may be one type of compound selected from the group consisting of dimethyl carbonate (DMC), diethyl carbonate (DEC), dipropyl carbonate (DPC), ethylmethyl carbonate (EMC), methylpropyl carbonate (MPC) and ethylpropyl carbonate (EPC) or a mixture of at least two or more types thereof, but are not limited thereto.

In addition, specific examples of the cyclic carbonate compound may be one type of compound selected from the group consisting of ethylene carbonate (EC), propylene carbonate (PC), 1,2-butylene carbonate, 2,3-butylene carbonate, 1,2-pentylene carbonate, 2,3-pentylene carbonate, vinylene carbonate and halides thereof or a mixture of at least two or more types thereof.

Lithium Secondary Battery

Hereinafter, a lithium secondary battery according to one embodiment of the present invention will be described.

In one embodiment of the present invention, the lithium secondary battery includes a positive electrode, a negative electrode, a separator and a non-aqueous electrolyte solution for a lithium secondary battery. More specifically, the lithium secondary battery includes at least one or more positive electrodes, at least one or more negative electrodes, a separator that may be selectively interposed between the positive electrodes and the negative electrodes, and the non-aqueous electrolyte solution for the lithium secondary battery. In this case, since the description on the non-aqueous electrolyte solution for a lithium secondary battery are the same as the descriptions provided above, specific descriptions thereon will be omitted.

(1) Positive Electrode

The positive electrode may be prepared by coating positive electrode active material slurry including a positive electrode active material, a binder for an electrode, an electrode conductive material, a solvent and the like on a positive electrode current collector.

The positive electrode current collector is not particularly limited as long as it has conductivity without causing chemical changes to the corresponding battery, and for example, stainless steel, aluminum, nickel, titanium, sintered carbon, or aluminum or stainless steel surface-treated with carbon, nickel, titanium, silver or the like may be used. In this case, the positive electrode current collector may also strengthen binding strength with the positive electrode active material by forming fine irregularities on the surface, and various forms such as films, sheets, foil, nets, porous bodies, foams or non-woven fabrics may be used.

The positive electrode active material is a compound capable of reversibly intercalating or deintercalating lithium, and may be specifically a lithium composite metal oxide including lithium and one or more types of metals such as cobalt, manganese, nickel or aluminum. More specifically, the lithium composite metal oxide may be a lithium-manganese-based oxide (for example, LiMnO$_2$, LiMn$_2$O$_4$ or the like), a lithium-cobalt-based oxide (for example, LiCoO$_2$ or the like), a lithium-nickel-based oxide (for example, LiNiO$_2$ or the like), a lithium-nickel-manganese-based oxide (for example, LiNi$_{1-Y1}$Mn$_{Y1}$O$_2$ (herein, 0<Y1<1), LiMn$_{2-Z1}$Ni$_{Z1}$O$_4$ (herein, 0<Z1<2) or the like), a lithium-nickel-cobalt-based oxide (for example, LiNi$_{1-Y2}$Co$_{Y2}$O$_2$ (herein, 0<Y2<1) or the like), a lithium-manganese-cobalt-based oxide (for example, LiCo$_{1-Y3}$Mn$_{Y3}$O$_2$ (herein, 0<Y3<1), LiMn$_{2-Z2}$Co$_{Z2}$O$_4$ (herein, 0<Z2<2) or the like), a lithium-nickel-manganese-cobalt-based oxide (for example, Li(Ni$_{p1}$Co$_{q1}$Mn$_{r1}$)O$_2$ (herein, 0<p1<1, 0<q1<1, 0<r1<1, p1+q1+r1=1) or Li(Ni$_{p2}$Co$_{q2}$Mn$_{r2}$)O$_4$ (herein, 0<p2<2, 0<q2<2, 0<r2<2, p2+q2+r2=2) or the like), a lithium-nickel-cobalt-transition metal (M) oxide (for example, Li(Ni$_{p3}$Co$_{q3}$Mn$_{r3}$M$_{S1}$)O$_2$ (herein, M is selected from the group consisting of Al, Fe, V, Cr, Ti, Ta, Mg and Mo, and p3, q3, r3 and s1 are atomic fractions of each independent elements and 0<p3<1, 0<q3<1, 0<r3<1, 0<s1<1, p3+q3+r3+s1=1) or the like) or the like, and may be any one or two or more compounds thereof.

Among these, the lithium composite metal oxide may be, in terms of increasing capacity properties and stability of the battery, LiCoO$_2$, LiMnO$_2$, LiNiO$_2$, a lithium nickel manganese cobalt oxide (for example, Li(Ni$_{0.6}$Mn$_{0.2}$Co$_{0.2}$)O$_2$, Li(Ni$_{0.5}$Mn$_{0.3}$Co$_{0.2}$)O$_2$, Li(Ni$_{0.8}$Mn$_{0.1}$Co$_{0.1}$)O$_2$ or the like), a lithium nickel cobalt aluminum oxide (for example, LiNi$_{0.8}$Co$_{0.15}$Al$_{0.05}$O$_2$ or the like) or the like, and considering the significance of improvement effects obtained by controlling types and content ratio of the constituting elements forming the lithium composite metal oxide, the lithium composite metal oxide may be Li(Ni$_{0.6}$Mn$_{0.2}$Co$_{0.2}$)O$_2$, Li(Ni$_{0.5}$Mn$_{0.3}$Co$_{0.2}$)O$_2$, Li(Ni$_{0.7}$Mn$_{0.15}$Co$_{0.15}$)O$_2$, Li(Ni$_{0.8}$Mn$_{0.1}$Co$_{0.1}$)O$_2$ or the like, and any one or a mixture of two or more thereof may be used.

The binder for an electrode is a component assisting binding of the positive electrode active material and the electrode conductive material and the like, and binding for the current collector. Specifically, the binder for an electrode may be polyvinylidene fluoride, polyvinyl alcohol, carboxyl methyl cellulose (CMC), starch, hydroxyl propyl cellulose, regenerated cellulose, polyvinyl pyrrolidone, polytetrafluoroethylene, polyethylene (PE), polypropylene, an ethylene-propylene-diene polymer (EPDM), a sulfonated EPDM, styrene-butadiene rubber, fluoro rubber, various copolymers thereof and the like.

The electrode conductive material is a component for further enhancing conductivity of the positive electrode active material. The electrode conductive material is not particularly limited as long as it has conductivity without causing chemical changes in the corresponding battery, and for example, may be graphite; carbon-based materials such as carbon black, acetylene black, ketjen black, channel black, furnace black, lamp black or thermal black; conductive fibers such as carbon fibers or metal fibers; fluorocarbon, aluminum, metal powders such as nickel powder; conductive whiskers such as zinc oxide or potassium titanate; conductive metal oxides such as titanium oxide; conductive materials such as polyphenylene derivatives, and the like. Specific examples of commercially available conductive materials are acetylene black series (Chevron Chemical Company), denka black (Denka Singapore Private Limited), products of Gulf Oil Company, Ketjen black, EC series (products of Armak Company), Vulcan XC-72 (products of Cabot Company), Super P (products of Timcal Ltd.) and the like.

The solvent may include an organic solvent such as N-methyl-2-pyrrolidone (NMP), and may be used in an amount to have preferable viscosity when including the positive electrode active material, and optionally the binder for a positive electrode, the positive electrode conductive material and the like.

(2) Negative Electrode

In addition, the negative electrode may be prepared by coating negative electrode active material slurry including a negative electrode active material, a binder for an electrode, an electrode conductive material, a solvent and the like on a negative electrode current collector. Meanwhile, a metal negative electrode current collector itself may be used as the negative electrode.

The negative electrode current collector is not particularly limited as long as it has high conductivity without causing chemical changes in the corresponding battery, and for example, may be copper, stainless steel, aluminum, nickel, titanium, baked carbon, copper or stainless steel surface-treated with carbon, nickel, titanium, silver or the like, aluminum-cadmium alloys or the like. In addition, like the positive electrode current collector, the negative electrode current collector may also strengthen binding strength with the negative electrode active material by forming fine irregularities on the surface, and may be used in various forms such as films, sheets, foil, nets, porous bodies, foams or non-woven fabrics.

As the negative electrode active material, one or more types of negative electrode active materials selected from the group consisting of natural graphite, artificial graphite, carbonaceous materials; lithium-containing titanium composite oxides (LTO), metals (Me) such as Si, Sn, Li, Zn, Mg, Cd, Ce, Ni or Fe; alloys formed with the metals (Me); oxides (MeO$_x$) of the metals (Me); and composite of the metals (Me) and carbon may be included.

Descriptions on the binder for an electrode, the electrode conductive material and the solvent are the same as the descriptions above, and therefore, specific descriptions thereon will be omitted.

(3) Separator

As the separator, common porous polymer films used as a separator in the art, for example, porous polymer films prepared with polyolefin-based polymers such as an ethylene homopolymer, a propylene homopolymer, an ethylene/butene copolymer, an ethylene/hexene copolymer and an ethylene/methacrylate copolymer may be used either alone or as a laminate thereof, or common porous non-woven fabrics, for example, non-woven fabrics made of glass fiber, polyethylene terephthalate fiber, etc. having a high melting point may be used, but the separator is not limited thereto.

Hereinafter, preferred examples are presented to help the understanding of the present invention, but the following examples are provided only to make the present invention easier to understand, and the present invention is not limited thereto.

EXAMPLE

1. Example 1

(1) Preparation of Non-Aqueous Electrolyte Solution for Lithium Secondary Battery Ethylene carbonate (EC):dimethyl carbonate (DMC) were mixed in a volume ratio of 30:70, and then LiPF$_6$ (lithium hexafluorophosphate) was dissolved therein to a concentration of 1.0 M to prepare a non-aqueous organic solvent. To the non-aqueous organic solvent, 1% by weight of a compound represented by the following Formula 1-1 was added as a first additive, and 2% by weight of vinylene carbonate (VC) and 1% by weight of 1,3-propanesultone (PS) were added thereto as a second additive to prepare a non-aqueous electrolyte solution for a lithium secondary battery.

[Formula 1-1]

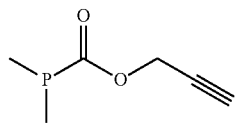

(2) Manufacture of Lithium Secondary Battery

A positive electrode active material (LiNi$_{0.8}$Co$_{0.1}$Mn$_{0.1}$O$_2$; NCM811), carbon black as a conductive material and polyvinylidene fluoride (PVDF) as a binder were mixed in a weight ratio of 97.7:0.3:2, and then added to N-methyl-2-pyrrolidone (NMP), which is a solvent, to prepare a positive electrode active material slurry. The positive electrode active material slurry was applied on an aluminum (Al) thin film, which is a positive electrode current collector, having a thickness of approximately 20 μm, then dried to prepare a positive electrode, and then the result was roll pressed to prepare a positive electrode.

Graphite as a negative electrode active material, polyvinylidene difluoride (PVDF) as a binder and carbon black as a conductive material were mixed in a weight ratio of 95:2:3, and then added to N-methyl-2-pyrrolidone (NMP), which is a solvent, to prepare negative electrode active material slurry. The negative electrode active material slurry was applied on a copper (Cu) thin film, which is a negative electrode current collector, having a thickness of 10 μm, then dried to prepare a negative electrode, and then the result was roll pressed to prepare a negative electrode.

The positive electrode, the negative electrode, and a separator formed with polypropylene/polyethylene/polypropylene (PP/PE/PP) were laminated in the order of the positive electrode/the separator/the negative electrode, and after placing the laminated structure in a pouch-type battery case, the non-aqueous electrolyte solution for a lithium secondary battery was injected thereto to manufacture a lithium secondary battery.

2. Example 2

A non-aqueous electrolyte solution for a lithium secondary battery and a lithium secondary battery were manufactured in the same manner as in Example 1, except that 3% by weight of the compound represented by Formula 1-1 was added to the non-aqueous organic solvent as the additive.

3. Example 3

A non-aqueous electrolyte solution for a lithium secondary battery and a lithium secondary battery were manufactured in the same manner as in Example 1, except that 1% by weight of a compound represented by Formula 1-2 was added as the additive instead of 1% by weight of the compound represented by Formula 1-1.

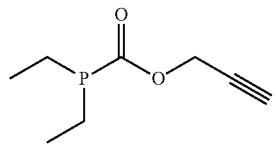

[Formula 1-2]

4. Example 4

A non-aqueous electrolyte solution for a lithium secondary battery and a lithium secondary battery were manufactured in the same manner as in Example 1, except that 1% by weight of a compound represented by Formula 1-3 was added as the additive instead of 1% by weight of the compound represented by Formula 1-1.

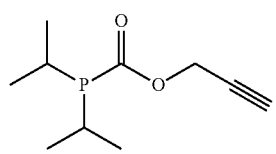

[Formula 1-3]

5. Example 5

A non-aqueous electrolyte solution for a lithium secondary battery and a lithium secondary battery were manufactured in the same manner as in Example 1, except that 1% by weight of a compound represented by Formula 1-4 was added as the additive instead of 1% by weight of the compound represented by Formula 1-1.

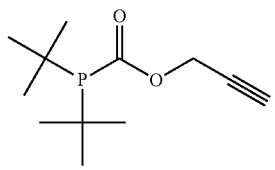

[Formula 1-4]

6. Example 6

A non-aqueous electrolyte solution for a lithium secondary battery and a lithium secondary battery were manufactured in the same manner as in Example 1, except that 1% by weight of a compound represented by Formula 1-5 was added as the additive instead of 1% by weight of the compound represented by Formula 1-1.

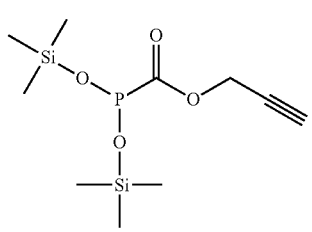

[Formula 1-5]

7. Example 7

A non-aqueous electrolyte solution for a lithium secondary battery and a lithium secondary battery were manufactured in the same manner as in Example 1, except that 1% by weight of a compound represented by Formula 1-6 was added as the additive instead of 1% by weight of the compound represented by Formula 1-1.

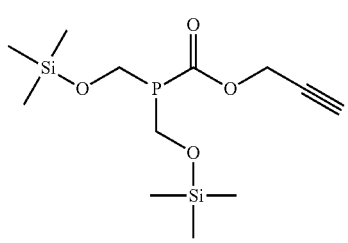

[Formula 1-6]

8. Example 8

A non-aqueous electrolyte solution for a lithium secondary battery and a lithium secondary battery were manufactured in the same manner as in Example 1, except that 1% by weight of a compound represented by Formula 1-7 was added as the additive instead of 1% by weight of the compound represented by Formula 1-1.

[Formula 1-7]

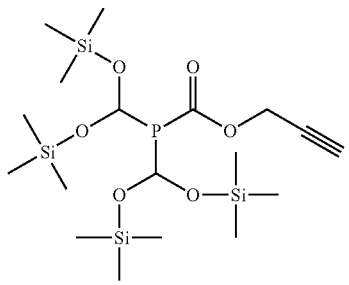

COMPARATIVE EXAMPLE

1. Comparative Example 1

A non-aqueous electrolyte solution for a lithium secondary battery and a lithium secondary battery were manufactured in the same manner as in Example 1, except that when preparing the electrolyte solution for a lithium secondary battery, the compound represented by Formula 1 was not used as the additive.

2. Comparative Example 2

A non-aqueous electrolyte solution for a lithium secondary battery and a lithium secondary battery were manufactured in the same manner as in Example 1, except that 15% by weight of the compound represented by Formula 1-1 was added as the additive.

3. Comparative Example 3

A non-aqueous electrolyte solution for a lithium secondary battery and a lithium secondary battery were manufactured in the same manner as in Example 1, except that 1% by weight of the following Comparative Compound 1 was added as the additive instead of 1% by weight of the compound represented by Formula 1-1.

[Comparative Compound 1]

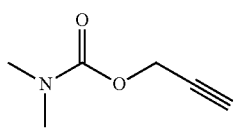

4. Comparative Example 4

A non-aqueous electrolyte solution for a lithium secondary battery and a lithium secondary battery were manufactured in the same manner as in Example 1, except that 1% by weight of the following Comparative Compound 2 was added as the additive instead of 1% by weight of the compound represented by Formula 1-1.

[Comparative Compound 2]

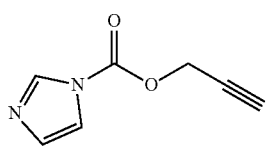

5. Comparative Example 5

A non-aqueous electrolyte solution for a lithium secondary battery and a lithium secondary battery were manufactured in the same manner as in Example 1, except that 1% by weight of the following Comparative Compound 3 was added as the additive instead of 1% by weight of the compound represented by Formula 1-1.

[Comparative Compound 3]

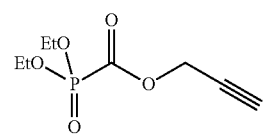

6. Comparative Example 6

A non-aqueous electrolyte solution for a lithium secondary battery and a lithium secondary battery were manufactured in the same manner as in Example 1, except that 1% by weight of the following Comparative Compound 4 was added as the additive instead of 1% by weight of the compound represented by Formula 1-1.

[Comparative Compound 4]

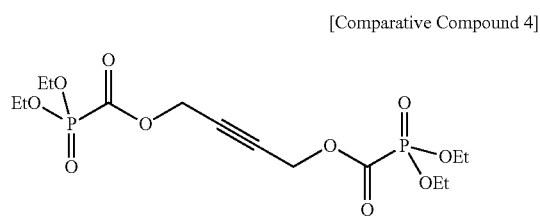 [SMILES: CCOP(=O)(OCC)C(=O)OCC#CCOC(=O)P(=O)(OCC)OCC]

The components and the contents of the additives used in Examples 1 to 8 and Comparative Examples 1 to 6 are shown in Table 1 below.

TABLE 1

| | Additive Type | Additive Content (% by weight) |
|---|---|---|
| Example 1 | Formula 1-1 | 1 |
| Example 2 | Formula 1-1 | 3 |
| Example 3 | Formula 1-2 | 1 |
| Example 4 | Formula 1-3 | 1 |
| Example 5 | Formula 1-4 | 1 |
| Example 6 | Formula 1-5 | 1 |
| Example 7 | Formula 1-6 | 1 |
| Example 8 | Formula 1-7 | 1 |
| Comparative Example 1 | — | 0 |
| Comparative Example 2 | Formula 1-1 | 15 |
| Comparative Example 3 | Comparative Compound 1 | 1 |
| Comparative Example 4 | Comparative Compound 2 | 1 |
| Comparative Example 5 | Comparative Compound 3 | 1 |
| Comparative Example 6 | Comparative Compound 4 | 1 |

EXPERIMENTAL EXAMPLE

1. Experimental Example 1: Evaluation of Quick Charging Performance

The lithium secondary batteries according to Examples 1 to 8 and Comparative Examples 1 to 6 were charged to 4.2 V/0.2 C mA at room temperature under a constant current/ constant voltage (CC/CV) condition of 1 C/4.2 V, and then discharged to 2.5 V under a constant current (CC) condition of 0.2 C to measure initial discharge capacity.

As described above, initial capacity of each of the lithium secondary batteries manufactured in Examples 1 to 8 and Comparative Examples 1 to 6 was measured, and then the lithium secondary battery in a state of charge (SOC) 3% was charged while changing the C-rate as described in the following Table 2 depending on the SOC state, and the voltage value was checked at an interval of 1 second for each charging section to measure the voltage profile.

After that, the finish condition was set using the finish time set in each section with the C-rate set for each SOC section from SOC 3% to SOC 78% at room temperature (25° C.) and the voltage value for each section obtained in the CC mode, so that the amount of charge when charging in the CC/CV mode was recorded. Then, discharging was performed to SOC 3% with 0.5 C in the CC mode again. The charging and discharging described above was performed as 1 cycle, and after 100 cycles, charge capacity was measured, and {charge capacity measured after 100 cycles/initial charge capacity}×100 was evaluated as a quick charge capacity retention rate (%). The measurement results are shown in the following Table 3.

TABLE 2

|  | Charging time (sec) | C-rate (C) |
|---|---|---|
| SOC 3% to 61% | 880 | 2.5 |
| SOC 62% to 78% | 620 | 1 |

TABLE 3

|  | Quick charge capacity retention rate (%) |
|---|---|
| Example 1 | 87 |
| Example 2 | 91 |
| Example 3 | 88 |
| Example 4 | 86 |
| Example 5 | 85 |
| Example 6 | 92 |
| Example 7 | 93 |
| Example 8 | 94 |
| Comparative Example 1 | 67 |
| Comparative Example 2 | 69 |
| Comparative Example 3 | 74 |
| Comparative Example 4 | 75 |
| Comparative Example 5 | 78 |
| Comparative Example 6 | 72 |

As shown in Table 3 above, the lithium secondary batteries of Examples 1 to 8 using the non-aqueous electrolyte solution according to one embodiment of the present invention had an excellent quick charge capacity retention rate of 85% or more.

On the other hand, it can be confirmed that Comparative Examples 1 to 6 in which the first additive was not added, the first additive was added in excess, or the compounds (Comparative Compounds 1 to 4) other than the first additive according to one embodiment of the present invention were used as the first additive had a significant decrease in the capacity after quick charge compared to the examples.

Experimental Example 2: Evaluation of Low-Temperature Discharge Output

After setting the state of charge of each of the lithium secondary batteries after initial charge and discharge in Experimental Example 1 to SOC 100% (state of charge, SOC 100%), discharge output capacity when discharging at a current of 2 C in a 0° C. chamber was measured, and the measured value was substituted into the following Equation 1 to evaluate a low-temperature discharge output retention rate (%). The measurement results are shown in Table 4 below.

Low-temperature discharge output retention rate (%)={low temperature (0° C.) 2 C discharge capacity/initial discharge capacity measured in Experimental Example 1 (room temperature)}× 100   [Equation 1]

TABLE 4

|  | Low temperature discharge output retention rate (%) |
|---|---|
| Example 1 | 76 |
| Example 2 | 73 |
| Example 3 | 74 |
| Example 4 | 74 |
| Example 5 | 72 |
| Example 6 | 79 |
| Example 7 | 81 |
| Example 8 | 81 |
| Comparative Example 1 | 52 |
| Comparative Example 2 | 45 |
| Comparative Example 3 | 48 |
| Comparative Example 4 | 49 |
| Comparative Example 5 | 55 |
| Comparative Example 6 | 55 |

Referring to Table 4, it was confirmed that the low-temperature discharge output capability of the lithium secondary batteries according to the examples was higher than the low-temperature discharge output of the lithium secondary batteries of the comparative examples.

Simple modifications and changes of the present invention are all within the scope of the present invention, and the specific protection scope of the present invention will become clear by the attached claims.

The invention claimed is:

1. A non-aqueous electrolyte solution for a lithium secondary battery, comprising:
   a lithium salt;
   an organic solvent; and
   a compound represented by Formula 1 as a first additive:

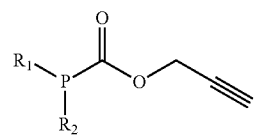

[Formula 1]

wherein, in Formula 1,
$R_1$ and $R_2$ are the same as or different from each other, and are each independently a substituted or unsubstituted C1 to C10 alkyl group; a substituted or unsubstituted C2 to C10 alkenyl group; a substituted or unsubstituted C2 to C10 alkynyl group; a substituted or unsubstituted C6 to C20 aryl group; or a substituted or unsubstituted C1 to C10 trialkylsiloxy group.

2. The non-aqueous electrolyte solution for a lithium secondary battery according to claim 1, wherein $R_1$ and $R_2$ are the same as or different from each other, and are each independently a substituted or unsubstituted C1 to C10 alkyl group; or a substituted or unsubstituted C1 to C10 trialkylsiloxy group.

3. The non-aqueous electrolyte solution for a lithium secondary battery according to claim 1, wherein $R_1$ and $R_2$ are substituted with a substituted or unsubstituted C3 to C10 trialkylsiloxy group.

4. The non-aqueous electrolyte solution for a lithium secondary battery according to claim 1, wherein the compound represented by Formula 1 is a compound represented by any one of Formula 1-1 to Formula 1-7:

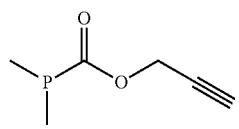

[Formula 1-1]

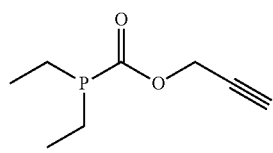

[Formula 1-2]

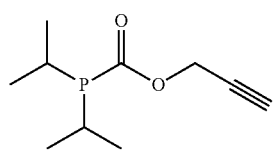

[Formula 1-3]

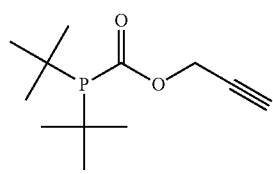

[Formula 1-4]

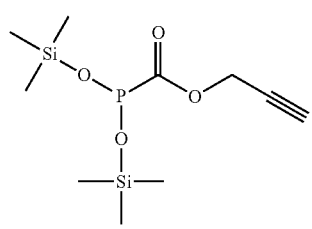

[Formula 1-5]

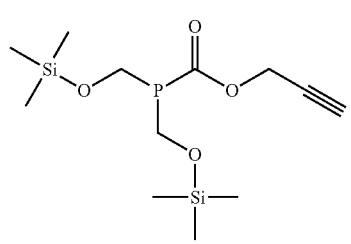

[Formula 1-6]

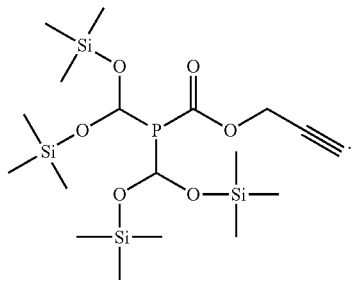

[Formula 1-7]

5. The non-aqueous electrolyte solution for a lithium secondary battery according to claim 1, wherein the first additive is included in an amount of 0.01% by weight to 10% by weight with respect to the total weight of the non-aqueous electrolyte solution.

6. The non-aqueous electrolyte solution for a lithium secondary battery according to claim 1, further comprising a second additive,
wherein the second additive is at least one selected from vinyl ethylene carbonate (VEC), vinylene carbonate (VC), fluoroethylene carbonate (FEC), propane sultone (PS), ethylene sulfate (ESa), succinonitrile (SN), 1,3,6-hexane tricarbonitrile (HTCN), 1,4-dicyano-2-butene (DCB), ethylene glycol bis(propionitrile) ether, propargyl 1H-imidazole-1-carboxylate, methyl prop-2-ynyl carbonate, fluorobenzene (FB), difluorobenzene, hexafluorobenzene, 1,1,2,2-tetrafluoroethyl-2,2,2-trifluoroethyl ether, bis(trifluoromethyl)-1,3-dioxolane or 1,1,2,2-tetrafluoroethyl-2,2,3,3-tetrafluoropropyl ether.

7. The non-aqueous electrolyte solution for a lithium secondary battery according to claim 6, wherein the second additive is included in an amount of 0.01% by weight to 10% by weight with respect to the total weight of the non-aqueous electrolyte solution.

8. The non-aqueous electrolyte solution for a lithium secondary battery according to claim 1, wherein the lithium salt is at least one selected from LiCl, LiBr, LiI, LiBF$_4$, LiClO$_4$, LiB$_{10}$Cl$_{10}$, LiAlCl$_4$, LiAlO$_4$, LiPF$_6$, LiCF$_3$SO$_3$, LiCH$_3$CO$_2$, LiCF$_3$CO$_2$, LiAsF$_6$, LiSbF$_6$, LiCH$_3$SO$_3$, LiFSI (lithium bis(fluorosulfonyl)imide, LiN(SO$_2$F)$_2$), LiTFSI (lithium bis(trifluoromethanesulfonyl)imide, LiN(SO$_2$CF$_3$)$_2$), LiBETI (lithium bisperfluoroethanesulfonimide, LiN(SO$_2$CF$_2$CF$_3$)$_2$), LiBETI (lithium bis(oxalate) borate, LiB(C$_2$O$_4$)$_2$), LiODFB (lithium difluoro(ethanedioato)borate, LiBF$_2$(C$_2$O$_4$)), LiDFP (lithium difluorophosphate, F$_2$LiO$_2$P), LiDFOP (lithium difluoro bis(oxlato) phosphate) or LiTDI (lithium 4,5-dicyano-2-(trifluoromethyl)imidazolide).

9. The non-aqueous electrolyte solution for a lithium secondary battery according to claim 1, wherein the lithium salt has a concentration of 0.1 M to 3 M.

10. The non-aqueous electrolyte solution for a lithium secondary battery according to claim 1, wherein the organic solvent includes at least one selected from ethers, esters, amides, linear carbonates or cyclic carbonates.

11. A lithium secondary battery comprising:
a positive electrode;
a negative electrode;
a separator interposed between the positive electrode and the negative electrode; and
the non-aqueous electrolyte solution for a lithium secondary battery according to claim 1.

12. The non-aqueous electrolyte solution for a lithium secondary battery according to claim 1, wherein $R_1$ and $R_2$ are the same as or different from each other, and are each independently an unsubstituted or substituted C1 to C4 alkyl group, wherein the substitution is a substituted or unsubstituted C3 to C5 trialkylsiloxy group.

* * * * *